United States Patent
Dooley et al.

(10) Patent No.: US 7,659,848 B2
(45) Date of Patent: Feb. 9, 2010

(54) EVENT LOCATION DETERMINATION

(75) Inventors: Saul Robin Dooley, Surrey (GB); Jamie Matthew Higgins, West Sussex (GB); Johan Peeters, Bierbeek (BG); Andrew Thomas Yule, East Grinstead (GB)

(73) Assignee: Geotate B.V., Eindhoven (NL)

( * ) Notice: Subject to any disclaimer, the term of this patent is extended or adjusted under 35 U.S.C. 154(b) by 0 days.

(21) Appl. No.: 12/150,709

(22) Filed: Apr. 29, 2008

(65) Prior Publication Data

US 2009/0267834 A1 Oct. 29, 2009

(51) Int. Cl.
*G01S 1/02* (2006.01)
(52) U.S. Cl. .............................. 342/357.13; 342/357.12
(58) Field of Classification Search ............. 342/357.06, 342/357.07, 357.12, 357.13, 457; 701/213, 701/215; 396/429
See application file for complete search history.

(56) References Cited

U.S. PATENT DOCUMENTS 7,455,224 B2 * 11/2008 Kochevar et al. ............. 235/382
2005/0171663 A1 * 8/2005 Mittelsteadt et al. .......... 701/35
2009/0065578 A1 * 3/2009 Peterson et al. ............. 235/382

OTHER PUBLICATIONS

Website printout from http://www.pentaxuser.co.uk/pages/news/nws_gpsbundle.html; 1 page; downloaded Mar. 12, 2008.
Website printout from http://www.photographyblog.com/index.php/weblog/comments/geotate_gps_for_digital_cameras/; 2 pages; downloaded Mar. 13, 2008.

* cited by examiner

*Primary Examiner*—Dao L Phan
(74) *Attorney, Agent, or Firm*—Blakely, Sokoloff, Taylor & Zafman LLP (57) ABSTRACT

A method of determining a location of an event of interest by processing signals from a satellite positioning system. The method comprises receiving recorded blocks of data samples of a satellite broadcast including blocks recorded at the approximate location of the event of interest, each block including one or more timestamps generated within a first portable device at which the samples were recorded; receiving a time of occurrence of the event recorded independently of the samples; comparing the timestamps and the time of occurrence to identify at least one block corresponding to the event; and processing the data samples of the identified at least one block to derive position information approximating the location of the event.

14 Claims, 4 Drawing Sheets

EVENT LOCATION DETERMINATION

This invention relates to methods of determining the location of an event of interest in conjunction with a satellite positioning system, such as GPS. In particular, it relates to providing external satellite positioning functionality for devices in which the necessary technology is not (or cannot be) integrated. A camera may be one such device.

The global positioning system is a satellite-based navigation system consisting of a network of up to 32 orbiting satellites (called space vehicles, "SV") that are in six different orbital planes. 24 satellites are required by the system design, but more satellites provide improved coverage. The satellites are constantly moving, making two complete orbits around the Earth in just under 24 hours.

The GPS signals transmitted by the satellites are of a form commonly known as Direct Sequence Spread Spectrum employing a pseudo-random code which is repeated continuously in a regular manner. The satellites broadcast several signals with different spreading codes including the Coarse/Acquisition or C/A code, which is freely available to the public, and the restricted Precise code, or P-code, usually reserved for military applications. The C/A code is a 1,023 bit long pseudo-random code broadcast with a chipping rate of 1.023 MHz, repeating every millisecond. Each satellite sends a distinct C/A code, which allows it to be uniquely identified.

A data message is modulated on top of the C/A code by each satellite and contains important information such as detailed orbital parameters of the transmitting satellite (called ephemeris), information on errors in the satellite's clock, status of the satellite (healthy or unhealthy), current date, and time. This part of the signal is essential to a GPS receiver determining an accurate position. Each satellite only transmits ephemeris and detailed clock correction parameters for itself and therefore an unaided GPS receiver must process the appropriate parts of the data message of each satellite it wants to use in a position calculation.

The data message also contains the so called almanac, which comprises less accurate information about all the other satellites and is updated less frequently. The almanac data allows a GPS receiver to estimate where each GPS satellite should be at any time throughout the day so that the receiver can choose which satellites to search for more efficiently. Each satellite transmits almanac data showing the orbital information for every satellite in the system.

A conventional GPS receiver reads the transmitted data message and saves the ephemeris, almanac and other data for continual use. This information can also be used to set (or correct) the clock within the GPS receiver.

To determine position, a GPS receiver compares the time a signal was transmitted by a satellite with the time it was received by the GPS receiver. The time difference tells the GPS receiver how far away that particular satellite is. By combining distance measurements from multiple satellites, position can be obtained by trilateration. With a minimum of three satellites, a GPS receiver can determine a latitude/longitude position (a 2D position fix). With four or more satellites, a GPS receiver can determine a 3D position which includes latitude, longitude, and altitude. The information received from the satellites can also be used to set (or correct) the clock within the GPS receiver.

By processing the apparent Doppler shifts of the signals from the satellites, a GPS receiver can also accurately provide speed and direction of travel (referred to as 'ground speed' and 'ground track').

Nearly all current GPS receivers work by processing signals from the satellites in "real time", as they come in, reporting the position of the device at the current time. Such "conventional" GPS receivers invariably comprise:

an antenna suitable for receiving the GPS signals, analogue RF circuitry (often called a GPS front end) designed to amplify, filter, and mix down to an intermediate frequency (IF) the desired signals so they can be passed through an appropriate analogue-to-digital (A/D) convertor at a sample rate normally of the order of a few MHz, digital signal processing hardware that carries out the correlation process on the IF data samples generated by the A/D converter, normally combined with some form of micro controller that carries out the "higher level" processing necessary to control the signal processing hardware and calculate the desired position fixes.

The less well known concept of "Store and Process Later" has also been investigated. This involves storing the IF data samples collected by a lo conventional antenna and analogue RF circuitry in some form of memory before processing them at some later time (seconds, minutes, hours or even days) and often at some other location, where processing resources are greater.

The key advantages of the Store and Process Later approach over conventional GPS receivers are that the cost and power consumption of the capturing device are kept to a minimum as no digital signal processing needs be done at the time of capture, and the grabs can be very short (e.g. 100 ms). If the subsequent signal processing is done when the relevant satellite data (ephemeris etc) can be obtained via some other method, this approach also removes the need to decode the (very slow) data message from the SVs in the capturing device, which in many cases leads to unacceptably long times to start up conventional devices.

The integration of satellite positioning functionality into consumer electronic devices has long been acknowledged to be desirable. However, due to the cost and complexity of conventional GPS receivers, this demand for converged devices has been largely unmet. The Store and Process Later paradigm promises to reduce the cost and complexity of integrating satellite positioning into devices such as digital cameras, but even this presents a cost barrier to consumers, who must upgrade individual electronic devices to new models.

According to an aspect of the current invention, there is provided a method of determining a location of an event of interest by processing signals from a satellite positioning system, the method comprising: receiving recorded blocks of data samples of a satellite broadcast, including blocks recorded at the approximate location of the event of interest, each block including one or more timestamps generated within a first portable device at which the samples were recorded; receiving a time of occurrence of the event recorded independently of the samples; comparing the timestamps and the time of occurrence to identify at least one block corresponding to the event; and processing the data samples of the identified at least one block to derive position information approximating the location of the event.

This method enables an external, low-complexity, portable satellite positioning receiver, operating in the Store and Process Later regime, to be used together with other standard consumer electronic devices to provide the same functionality as an integrated GPS receiver. Furthermore, by using separately recorded event-times of interest to guide the subsequent processing of the satellite signal samples, the processing burden can be reduced to a minimum. Rather than, for example, generating a full record of the track of the GPS receiver over time, the method allows processing effort to be concentrated on the points of interest. Notably, there is no requirement to capture blocks of data at the exact time or location of the event of interest. The method will derive position information approximating the location of the event, with a precision related to the temporal and spatial proximity of the recording of the blocks to the event itself. Thus, the nearer the recording of the blocks is to the event, the greater the accuracy of the approximation. The method is therefore flexible in relation to varying accuracy requirements.

Preferably, the time of occurrence of the event is received from a second portable device.

If the event-time is recorded by a separate portable device (for example a device associated with the event) then the overall procedure can be completely automated. Crucially, this is achieved without any interface or link between diverse devices and hence is compatible with legacy devices of all kinds.

Advantageously, multiple blocks corresponding to the event are identified and the step of processing the data samples comprises: deriving at least one position corresponding to each block; and interpolating among the derived positions to approximate the location of the event, based upon the recorded time of occurrence.

Interpolation can improve the accuracy of position estimates. In a typical scenario, there is no possibility to synchronise the grabbing of blocks of data samples with the event or events of interest. Thus, recorded blocks are unlikely to correspond exactly with the time and position of an event. Interpolation permits estimates of the position to be refined based on knowledge of a small number of consecutive grabs representing a local track of discrete positions over time. Conversely, interpolation may allow the frequency or density of grabs to be reduced without significantly sacrificing location accuracy.

Also advantageously, the step of processing the data samples comprises: deriving at least one position and at least one velocity corresponding to the at least one identified block; and using the derived position and velocity to approximate the location of the event, based on the recorded time of occurrence.

Velocity estimates can provide a further set of constraints to make interpolation between a number of discrete positions more accurate. Alternatively, a velocity estimate could be used to project a distance in a given direction of travel, starting from a single position estimate.

The method may also comprise compensating for an error between the recorded time of occurrence and the timestamps.

Since the event-times and the timestamps are recorded independently, typically based on different clocks, there is a risk of a mutual error, which would lead to a systematic shift in subsequently derived location estimates along the historical track taken by the first portable device. Compensating for a timing offset can therefore improve the accuracy of location.

According to another aspect of the invention, there is provided a method of determining a location of an event of interest by processing signals from a satellite positioning system, the method comprising: recording blocks of data samples of a satellite broadcast, including blocks recorded at the approximate location of the event of interest, each block including one or more timestamps; recording a time of occurrence of the event; and determining the location of capture according to the method described above.

According to still another aspect of the invention, there is provided an apparatus for determining a location of an event of interest by processing signals from a satellite positioning system, the apparatus comprising: first receiving means, adapted to receive recorded blocks of data samples of a satellite broadcast including blocks recorded at the approximate location of the event of interest, each block including one or more timestamps generated within a first portable device at which the samples were recorded; second receiving means, adapted to receive a time of occurrence of the event recorded independently of the samples; and a processor, adapted to compare the timestamps and the time of occurrence to identify at least one block corresponding to the event and to process the data samples of the identified at least one block to derive position information approximating the location of the event.

According to still another aspect of the invention, there is provided an apparatus for determining a location of an event of interest by processing signals from a satellite positioning system, the apparatus comprising: a first portable device adapted to record blocks of data samples of a satellite broadcast, including blocks recorded at the approximate location of the event of interest, each block including one or more timestamps generated within the device; and apparatus as described above.

The invention will now be described by way of example with reference to the accompanying drawings, in which.

The invention provides a method of processing stored satellite positioning system data, such as GPS data. This can be used in many Store and Process Later applications, where it is desirable for the receiver to have the GPS signal processing capability removed, and for this to be implemented remotely.

In a typical application, a small capture device which stores short "grabs" of IF data samples into memory can subsequently upload its IF data grabs to a shared central computer which would not only carry out the necessary signal processing (correlation etc), but would also have access to a database of recent satellite information (ephemeris etc) by being connected to one or more conventional GPS receivers which relayed key parts of the GPS data message they received to the central computer.

In particular, the invention supports Store and Process applications in which it is desired to supplement an existing device having no GPS capability and potentially limited interface capabilities, effectively providing it with GPS, simply by carrying a simple GPS Store and Process Later receiver with the existing device, when in use. No interconnection or prior synchronization between the GPS receiver and the existing device is necessary. Indeed, a single GPS receiver may support multiple existing devices.

A GPS receiver of this type can be realized as a lightweight, convenient and ultra low power GPS logger, in contrast to the bulky, inconvenient, slow and inefficient loggers achievable with conventional GPS solutions. It therefore enables simple, inexpensive geotagging, using devices which are light yet can last for weeks or months on a single battery charge.

The invention will be described with reference to an embodiment relating to digital photography. However, as will be apparent to the skilled person, it is applicable to devices other than cameras.

Figure 1:
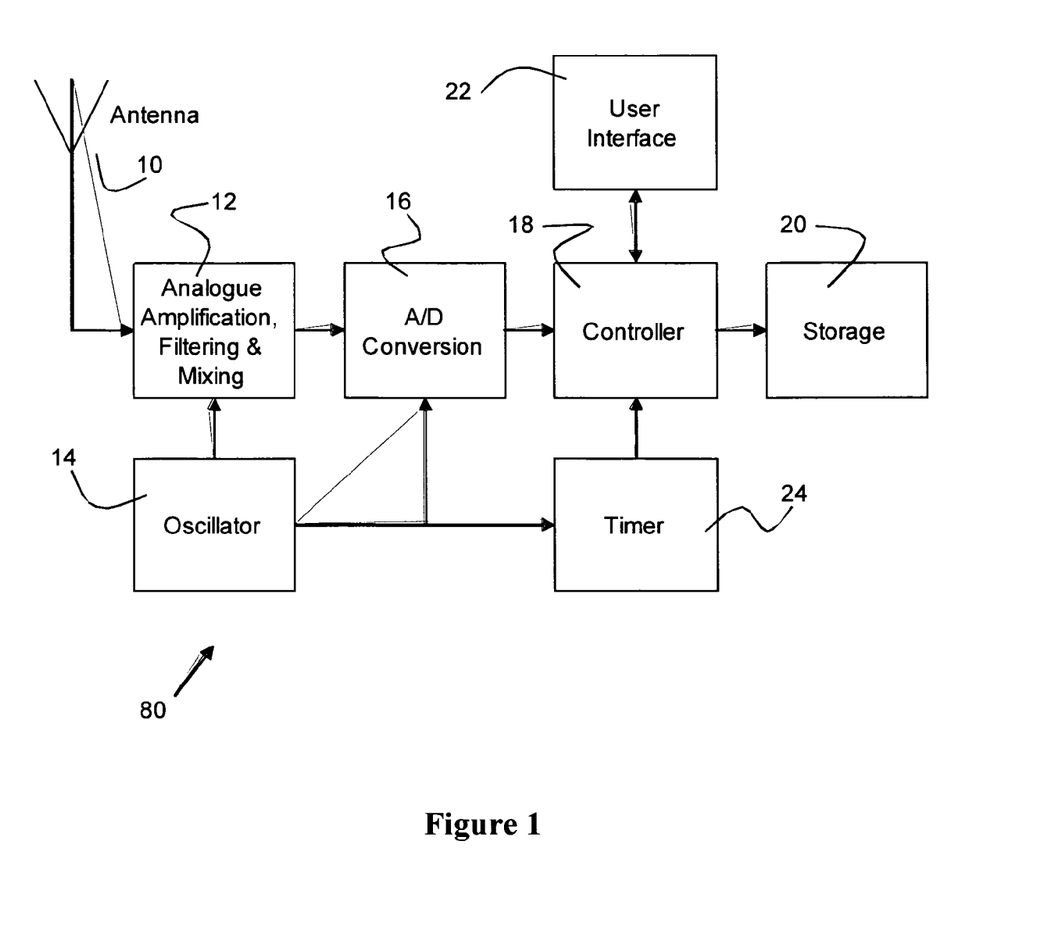
FIG. 1 shows a GPS receiver suitable for Store and Process Later operation.

FIG. 1 is a system diagram of a Store and Process Later GPS accessory 80. The signals from the GPS satellites are received by the antenna 10 and then put through conventional analogue processing, typically comprising a combination of amplification, filtering and down mixing in unit 12 driven by a reference oscillator 14 (normally a temperature compensated crystal), followed by A/D conversion in unit 16. This is the conventional radio receiver electronics forming the RF front end.

A controller 18, implemented as discrete logic or a micro processor with associated firmware, selects portions of the sampled IF data generated by the RF front end to be stored in the storage device 20, for example a flash RAM, hard disc etc. The manner in which it does this is influenced by settings from is the user (as input by the GUI 22) and the use of a timer 24 which can also be driven by the oscillator 14 as shown.

The timer 24 can be as simple as a counter driven by the oscillator, or it could be a real-time clock (RTC) which keeps date and time even when the device is otherwise turned off. It may have a separate oscillator to minimise "off" energy usage.

When activated, the device records short blocks of IF data from the RF front end (these short blocks are termed "grabs" in the following description) along with an associated timestamp from the timer 24. These grabs may be for example 100 ms long and they could be recorded at regular intervals, for example once every 10 s. The exact values used could be varied explicitly or implicitly by the user via the GUI 22. In different applications, different length grabs will be appropriate. Typically, each grab will be shorter than the subframe duration of 6 s, and preferably less than 500 ms.

Preferably, energy consumption in the periods between grabs is minimized by turning off as many components of the GPS receiver 80 as possible. A minimal set of components, including the timer 24, remain active, in order to "wake" the receiver at the time of the next grab. The battery life of the portable receiver 80 can therefore be extended.

The GUI 22 may vary in complexity in different implementations. For example, only minimal functions such as an on/off switch may be provided, or more complex configuration of the device's capture parameters may be possible. Alternatively, configuration may be provided through a user interface on a personal computer to which the device is connected to upload the recorded data samples.

The logic implemented by the controller is explained with reference to FIG. 2. The "Initialise system" step 30 involves selecting how long each grab should be and what the period between grabs is. The GPS IF data of one grab is stored in step 32, and the timing for the next grab is determined in step 34. Periodically, there is a test in step 36 to see if the user has instructed the data recording to stop or if the time for the next grab has been reached (step 38). While the time for the next grab has not been reached, the system is in a waiting mode, but monitoring if the recording is stopped. Step 40 monitors if data can be downloaded, and step 42 relates to the uploading of the recorded grabs to a PC for subsequent processing.

Figure 3:
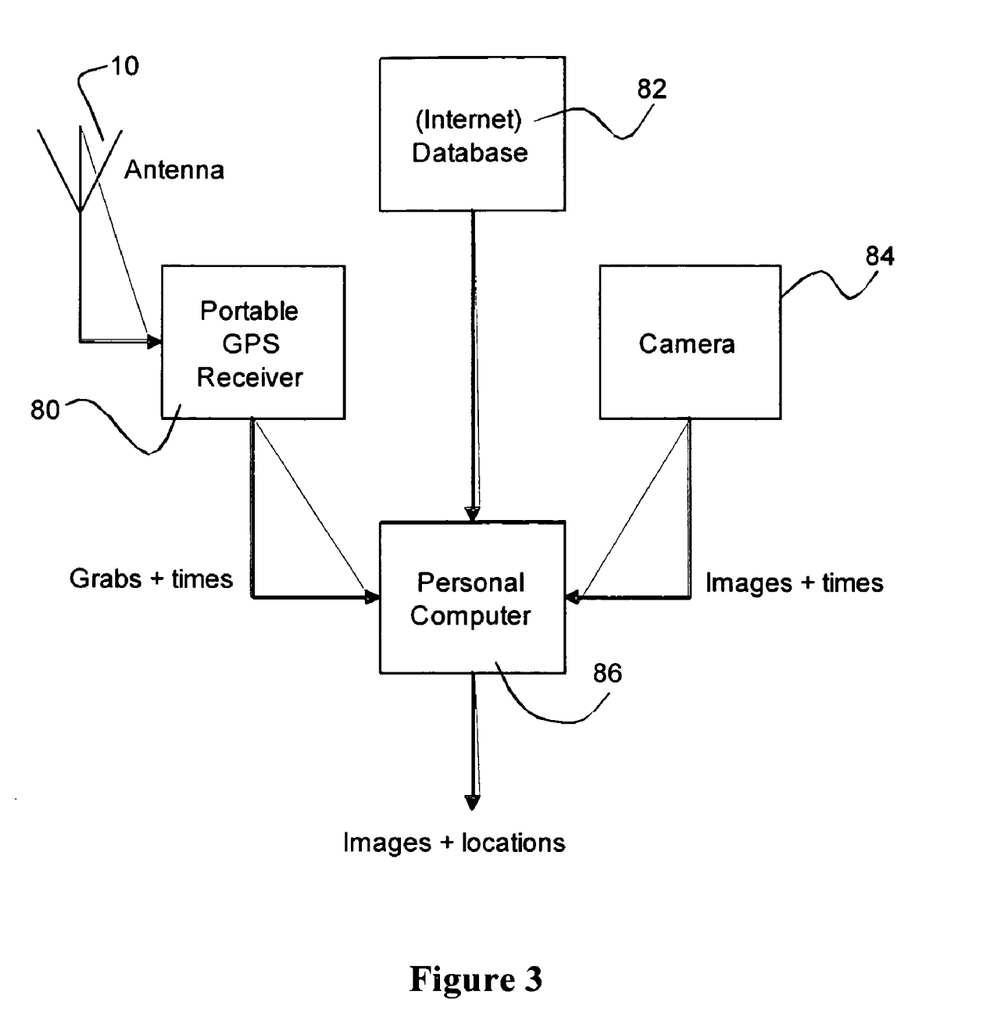
FIG. 3 shows a system according to an embodiment of the invention.

FIG. 3 depicts a system diagram according to one aspect of the invention. The system includes a portable GPS receiver 80, a camera 84 and a personal computer 86.

In use, the portable GPS receiver accessory 80 and camera 84 are carried together by the user. For example, the receiver 80 could be implemented as an armband, wristwatch, keyfob, belt-clip or any other small form-factor device which is easily carried. As the user moves about, the GPS device 80 records blocks of IF samples, typically intermittently, and stores them in its internal memory, together with local timestamps. This data comprises sufficient information—at least when combined with ephemeris data available from the database 82—to potentially generate a full trajectory log of (discrete) positions over time.

Note that there is no guarantee that a given recorded block of samples will be viable for deriving a position fix. The Store and Process Receiver may fail to "acquire" satellite data signals in exactly the same way as a conventional (real-time) receiver, when the signal strength drops too much—the difference being that, due to the distributed processing of the Store and Process case, this will only be determined after the event. As a result, there is an inherent trade-off between, on the one hand, capturing a grab long enough to achieve the necessary robustness and, on the other, minimizing the time, power and storage overheads in capture.

Independently of the GPS receiver accessory 80, the camera is used to capture photographs and/or videos, each with an associated time of capture. Later, the receiver 80 and camera 84 are connected to a personal computer 86. For convenience, they may be connected at the same time, but this is not necessary for the operation of the system.

Figure 4:
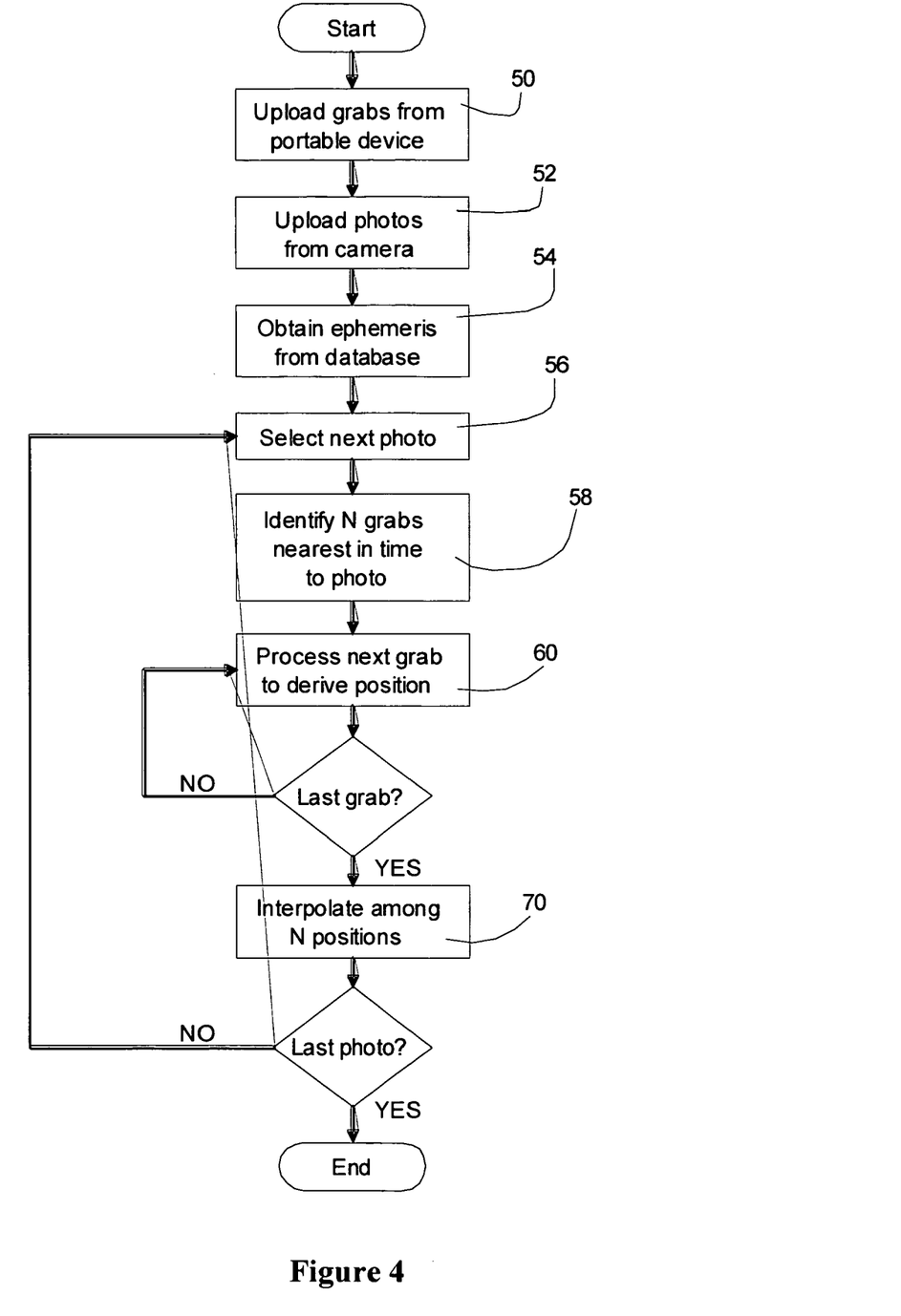
FIG. 4 shows a data processing method according to an embodiment of the invention.

The personal computer processes the images and recorded IF grabs according to the method shown in FIG. 4. At step 50, the recorded grabs, with timestamps, are uploaded from the receiver 80 and at step 52, the images, with capture times, are uploaded from the camera. Each upload operation may utilise any communication link available, including wired, wireless or infrared links.

At step 54 the computer obtains ephemeris data for the GPS satellites from a database 82, such as one accessible over the internet. The availability of full ephemeris data from a separate source (other than the recorded IF grabs) brings a number of benefits. It can enable position estimates to be derived from grabs of minimal length, or enable the computer to do so with minimal processing effort.

The computer then iterates over the uploaded photos, selecting a photo at step 56 and, based on the recorded timestamps of the grabs and capture-time of the image, identifying at step 58 a small number N of grabs closest to the capture-time of the photo.

For each grab, processing at step 60 determines a position estimate. This processing will be well-known to those skilled in the art. It essentially involves a search of the IF samples for the signals of as many SVs as possible, followed by estimation of the time of flight of those signals and trilateration to derive a position. At this stage, the downloaded ephemeris data can be used to guide the search. For example, knowing the time of capture of the photograph and the positions over time of each SV, only certain SVs would be visible to a receiver in a given position. Thus, once a signal corresponding one of the SVs is found, a number of other SVs which could not simultaneously be visible can be eliminated from the search.

Consecutive grabs may be processed consecutively. This allows the search to be further constrained, on the basis that consecutive grabs will represent nearby positions and times. For example, a SV-signal found in one grab is very likely to be present in the preceding and subsequent grabs in the sequence—the search can prioritise such SVs.

When the N grabs have been processed to provide N discrete GPS position estimates, interpolation is performed at step 70, to generate a smoother track of position over time. This is then used to more accurately approximate the position corresponding to the capture time of the photo, which will be likely to occur between two successive grabs. Various appropriate linear and non-linear interpolation methods will be well known to those skilled in the art.

The computer then proceeds to select and process the next photo. Again, it may be advantageous to select a photo taken at a time similar to one already processed. The same benefits described above, in terms of constraining the search space, will be available. Alternatively, for example, the photo may be chosen according to a selection by the user.

In a more advanced embodiment, instead of relying solely on position estimates, velocity estimates derived from the IF grabs can be incorporated in the location estimation process. It is well known to derive velocity estimates from the apparent Doppler shift of received GPS signals and the same algorithms are equally applicable to the recorded IF grabs. The velocity estimates can be used to improve the accuracy of the interpolation process. In turn, this may enable sparser spacing of grabs, since the resulting increase in uncertainty in the position estimate can be compensated to some degree by decreased uncertainty in the velocity.

A further refinement is compensating for errors in recording the grab timestamps and photo capture times. It is possible to calculate the time of capture of a given grab very accurately, based on knowledge of the satellite-clock obtained from the ephemeris—in fact this is a by-product of the process of calculating position estimates for each grab. A temporal offset can then be computed between the (latterly calculated) actual time of receipt and the timestamp recorded internally by the GPS receiver at the time of recording. The necessary correction can be downloaded from the computer to the GPS receiver to improve the accuracy in future.

In general, in order to derive an accurate and unambiguous time from an IF grab it is necessary to obtain enough samples of the data message to establish which part of the message has been observed. A single 100 ms grab will not fulfill this requirement unless the receiver clock (timer 24) is already accurate to better than 10 ms, as only five 20 ms long data bits may be observed. If the timer 24 is indeed this accurate then seeing a single bit edge is sufficient to enable derivation of the exact time; however, RTCs are rarely this accurate in practice.

To avoid this limitation, the receiver can capture a single long grab (7.2 s or more). This length should ensure that enough of the data message will be observed to establish the exact point in the data message and therefore the apparent error in the RTC. Any other grabs taken in proximity to that grab (before or after) would share a similar error, since a typical crystal oscillator would take many minutes to lose or gain as much as 10 ms. It is therefore possible to establish accurate time from these grabs despite them being only 100 ms long. In turn, this accurate time can be propagated to other short grabs in proximity to the first set. Thus, for example, if recording grabs once per minute for a period of several hours, only a single 7.2 s grab might be necessary to establish accurate time for all of the grabs (although, one per hour might be a wise precaution).

Other approaches to establish accurate time are possible—for example, it is theoretically possible to establish unambiguous synchronisation with the data message from a large number of short grabs).

Another source of temporal error is the lack of synchronization between the internal clock of the camera and either the receiver clock (timer 24) or "true" GPS-time (as computed from the data samples). This type of error will lead to shifted location estimates, since the incorrectly recorded time of capture of a photograph will result in association with the wrong grabs. However, these errors can also be corrected a-posteriori, at the computer, by comparing the current time reported by the clock in the GPS receiver 80 with that of the camera's clock, when both are connected for upload. Again, if possible, a correction factor could be automatically downloaded to the camera.

The invention has been described in connection with (single frequency) GPS, but other GNSS systems (GLO-NASS, Galileo etc) would be similar. Indeed the techniques could also be applied to multiple frequency systems.

GPS transmits at several different frequencies. At present only a single frequency is of interest to civilian users, but plans for other publically available frequencies are well advanced and will be covered by Galileo for example. Store and Process Later receivers can handle this by:
a) Capturing each frequency separately in parallel (using multiple RF front ends or a single RF front end with multiple parallel signal paths)
b) Capturing each frequency separately in serial (needing only a single front end which can be switched/programmed to move between the chosen frequencies—for example, with different bandwidths and filter settings)
c) Capturing all frequencies together, by using a front-end that mixes all the frequencies down to generate a single output with the different frequencies in the same IF signal, offset by much smaller amounts than when they were transmitted.

GLONASS uses slightly different transmission frequencies for different satellites. A Store & Process receiver for GLONASS could be implemented, for example, by capturing the whole bandwidth with a higher sampling rate.

Figure 2:
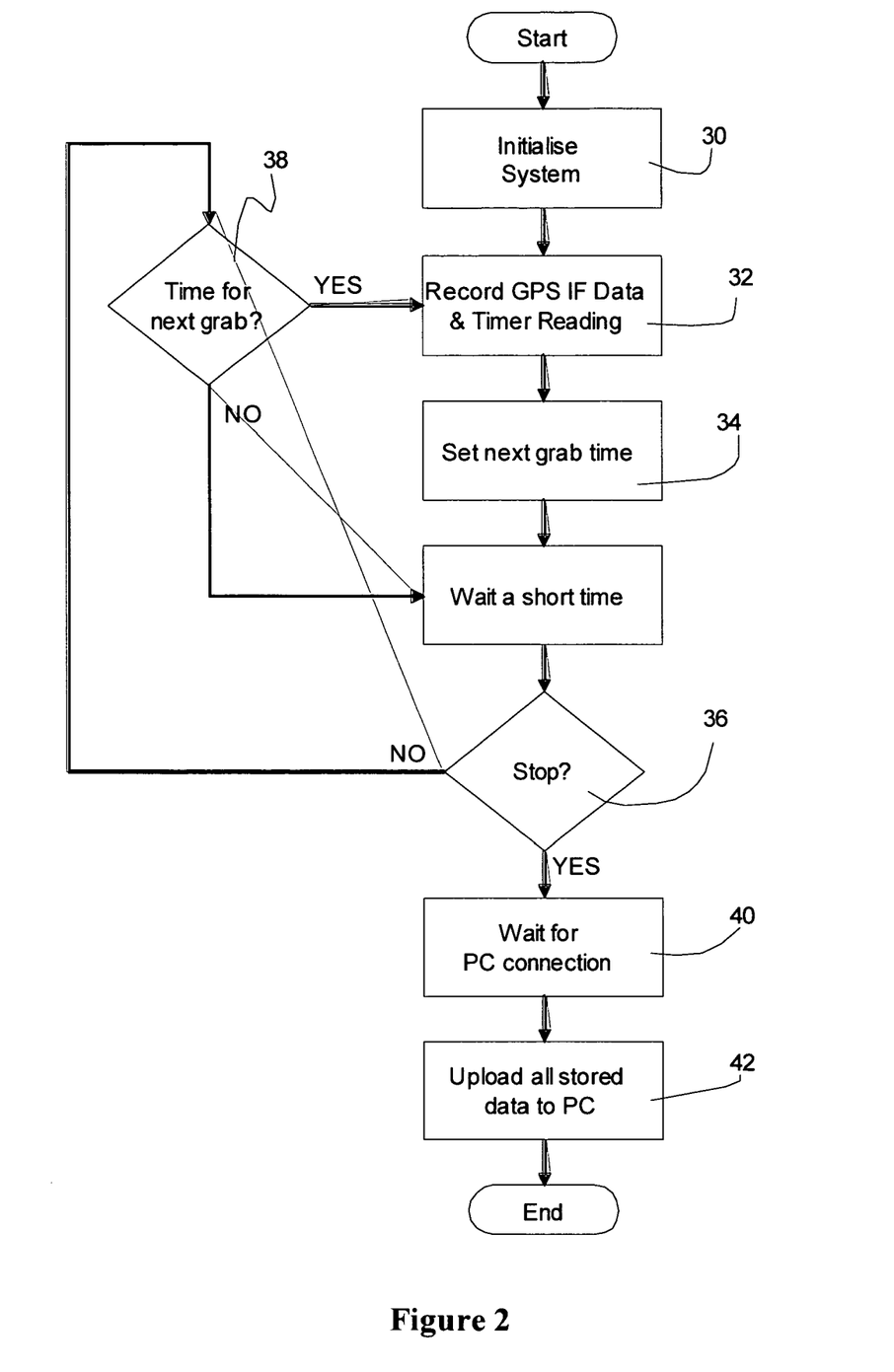
FIG. 2 shows a Store and Process Later data recording method.

Other possible variations include reordering of the process steps shown in FIG. 2. For example, the step 54 of obtaining ephemeris data from a database may be carried out after step 58—that is, after the times of the photos and corresponding IF grabs of interest are established. This could enable selective download of the ephemeris data relevant to the time of capture of the photographs and would be useful when, for example, the bandwidth of a communication-link to the database is limited.

Similarly, the upload of grabs from the portable GPS receiver 80 (in step 50 of FIG. 2) could be carried out after the upload 52 of the photos from the camera. The upload of IF grabs could then be selective, such that the computer requests the GPS receiver to upload only those grabs recorded in a suitable time-window before and after each photo. This approach would reduce the overhead involved in transferring unnecessarily large numbers of Io data samples between the GPS receiver 80 and PC 86.

Just as the process steps may be reordered, similarly, system components may be connected in different topologies. For example, in FIG. 3, the camera 84 could be connected via the GPS receiver 80 to the personal computer 86. In such a "daisy chain" topology, the portable GPS receiver may incorporate additional intelligence, such that it performs the step 58 of associating grabs with photos and then delivers them together to the personal computer, for processing of the data samples to determine location.

Various other modifications will be apparent to those skilled in the art.

The invention claimed is:

1. A method of determining a location of an event of interest by processing signals from a satellite positioning system, the method comprising:
receiving recorded blocks of data samples of a satellite broadcast including blocks recorded at the approximate location of the event of interest, each block including one or more timestamps generated within a first portable device at which the samples were recorded;
receiving a time of occurrence of the event recorded independently of the samples;
comparing the timestamps and the time of occurrence to identify at least one block corresponding to the event; and processing the data samples of the identified at least one block to derive position information approximating the location of the event.

2. The method of claim 1, wherein the time of occurrence of the event is recorded at a second portable device.

3. The method of claim 1 or 2, wherein the at least one identified block comprises a plurality of blocks and the step of processing the data samples comprises:
deriving at least one position corresponding to each block; and
interpolating among the derived positions to approximate the location of the event, based upon the recorded time of occurrence.

4. The method of claim 1 or 2, wherein the step of processing the data samples comprises:
deriving at least one position and at least one velocity corresponding to the at least one identified block; and
using the derived position and velocity to approximate the location of the event, based on the recorded time of occurrence.

5. The method of claim 1 or 2, further comprising compensating for an error between the recorded time of occurrence and the timestamps.

6. The method of claim 2, wherein the event of interest is the capture of an image or a sequence of images and the second portable device is a camera.

7. The method of claim 1 or 2, wherein the samples comprise intermediate frequency downconverted data samples.

8. A method of determining a location of an event of interest by processing signals from a satellite positioning system, the method comprising:
recording blocks of data samples of a satellite broadcast, including blocks recorded at the approximate location of the event of interest, each block including one or more timestamps;
recording a time of occurrence of the event; and
determining the location of capture according to the method of claim 1.

9. A computer program comprising computer program code means adapted to perform all the steps of claim 1 or 2 when said program is run on a computer.

10. A computer program as claimed in claim 9 embodied on a computer-readable medium.

11. Apparatus for determining a location of an event of interest by processing signals from a satellite positioning system, the apparatus comprising:
first receiving means, adapted to receive recorded blocks of data samples of a satellite broadcast including blocks recorded at the approximate location of the event of interest, each block including one or more timestamps generated within a first portable device at which the samples were recorded;
second receiving means, adapted to receive a time of occurrence of the event recorded independently of the samples; and
a processor, adapted to compare the timestamps and the time of occurrence to identify at least one block corresponding to the event and to process the data samples of the identified at least one block to derive position information approximating the location of the event.

12. Apparatus for determining a location of an event of interest by processing signals from a satellite positioning system, the apparatus comprising:
a first portable device adapted to record blocks of data samples of a satellite broadcast, including blocks recorded at the approximate location of the event of interest, each block including one or more timestamps generated within the device; and
apparatus according to claim 11.

13. The apparatus of claim 12, further comprising a second portable device for recording the time of occurrence of the event.

14. The apparatus of claim 13, wherein the event of interest is the capture of an image or a sequence of images and the second portable device is a camera.

* * * * *

UNITED STATES PATENT AND TRADEMARK OFFICE
CERTIFICATE OF CORRECTION

| | | |
|---|---|---|
| PATENT NO. | : 7,659,848 B2 | Page 1 of 6 |
| APPLICATION NO. | : 12/150709 | |
| DATED | : February 9, 2010 | |
| INVENTOR(S) | : Dooley et al. | |

It is certified that error appears in the above-identified patent and that said Letters Patent is hereby corrected as shown below:

The Title page;

The Title page, showing the illustrative figure, should be deleted and substitute therefor the attached Title page.

Delete figs. 1-4 and substitute therefor the drawing sheets, consisting of figs. 1-4 as shown on the attached page.

Signed and Sealed this
Twenty-fourth Day of January, 2012

David J. Kappos
*Director of the United States Patent and Trademark Office*

(12) United States Patent
Dooley et al.

(10) Patent No.: US 7,659,848 B2
(45) Date of Patent: Feb. 9, 2010

(54) EVENT LOCATION DETERMINATION

(75) Inventors: Saul Robin Dooley, Surrey (GB); Jamie Matthew Higgins, West Sussex (GB); Johan Peeters, Bierbeek (BG); Andrew Thomas Yule, East Grinstead (GB)

(73) Assignee: Geotate B.V., Eindhoven (NL)

( * ) Notice: Subject to any disclaimer, the term of this patent is extended or adjusted under 35 U.S.C. 154(b) by 0 days.

(21) Appl. No.: 12/150,709

(22) Filed: Apr. 29, 2008

(65) Prior Publication Data
US 2009/0267834 A1 Oct. 29, 2009

(51) Int. Cl.
*G01S 1/02* (2006.01)
(52) U.S. Cl. ............................ 342/357.13; 342/357.12
(58) Field of Classification Search .......... 342/357.06, 342/357.07, 357.12, 357.13, 457; 701/213, 701/215; 396/429
See application file for complete search history.

(56) References Cited
U.S. PATENT DOCUMENTS
7,455,224 B2 * 11/2008 Kochevar et al. ............ 235/382

2005/0171663 A1 * 8/2005 Mittelsteadt et al. ......... 701/35
2009/0065578 A1 * 3/2009 Peterson et al. ............. 235/382

OTHER PUBLICATIONS

Website printout from http://www.pentaxuser.co.uk/pages/news/nws_gpsbundle.html; 1 page; downloaded Mar. 12, 2008.
Website printout from http://www.photographyblog.com/index.php/weblog/comments/geotate_gps_for_digital_cameras/; 2 pages; downloaded Mar. 13, 2008.

* cited by examiner

*Primary Examiner*—Dao L Phan
(74) *Attorney, Agent, or Firm*—Blakely, Sokoloff, Taylor & Zafman LLP (57) ABSTRACT

A method of determining a location of an event of interest by processing signals from a satellite positioning system. The method comprises receiving recorded blocks of data samples of a satellite broadcast including blocks recorded at the approximate location of the event of interest, each block including one or more timestamps generated within a first portable device at which the samples were recorded; receiving a time of occurrence of the event recorded independently of the samples; comparing the timestamps and the time of occurrence to identify at least one block corresponding to the event; and processing the data samples of the identified at least one block to derive position information approximating the location of the event.

14 Claims, 4 Drawing Sheets